US011322753B2

(12) United States Patent
Planque et al.

(10) Patent No.: US 11,322,753 B2
(45) Date of Patent: May 3, 2022

(54) INTERCONNECTOR WITH A RUGGED SURFACE FOR BETTER TIGHTNESS

(71) Applicant: COMMISSARIAT A L'ENERGIE ATOMIQUE ET AUX ENERGIES ALTERNATIVES, Paris (FR)

(72) Inventors: Michel Planque, Seyssins (FR); Charlotte Bernard, Contamine sur Arve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/769,876

(22) PCT Filed: Dec. 14, 2018

(86) PCT No.: PCT/FR2018/053296
§ 371 (c)(1),
(2) Date: Jun. 4, 2020

(87) PCT Pub. No.: WO2019/122631
PCT Pub. Date: Jun. 27, 2019

(65) Prior Publication Data
US 2021/0175518 A1    Jun. 10, 2021

(30) Foreign Application Priority Data
Dec. 19, 2017    (FR) ........................................ 1762483

(51) Int. Cl.
*H01M 8/0206*        (2016.01)
*H01M 8/0273*        (2016.01)
(Continued)

(52) U.S. Cl.
CPC ....... *H01M 8/0206* (2013.01); *H01M 8/0273* (2013.01); *H01M 8/0282* (2013.01); *H01M 2008/1293* (2013.01)

(58) Field of Classification Search
CPC . H01M 8/0206; H01M 8/0273; H01M 8/0282
See application file for complete search history.

(56) References Cited

U.S. PATENT DOCUMENTS

2002/0055028 A1   5/2002   Ghosh et al.
2003/0194369 A1*  10/2003  Prasad ................. H01M 8/065
                                                      423/658.2
(Continued)

FOREIGN PATENT DOCUMENTS

EP    2 936 595 A1   10/2015
FR    2 947 540 A1    1/2011
(Continued)

OTHER PUBLICATIONS

International Search Report dated Mar. 14, 2019 in PCT/FR2018/053296 filed on Dec. 14, 2018, citing documents AA, AO and AW-AY therein, 3 pages (Continued)

*Primary Examiner* — Olatunji A Godo
(74) *Attorney, Agent, or Firm* — Oblon, McClelland, Maier & Neustadt, L.L.P.

(57) ABSTRACT

Implementation of an interconnector structure for an SOEC or SOFC electrochemical device, the interconnector being formed of a conductive support element having a first face with a rough region, the roughness of which has been modified locally before being brought into contact with a seal.

17 Claims, 4 Drawing Sheets

(51) Int. Cl.
  *H01M 8/0282* (2016.01)
  *H01M 8/12* (2016.01)

(56) References Cited

U.S. PATENT DOCUMENTS

| | | |
|---|---|---|
| 2012/0318022 A1 | 12/2012 | Nonnet et al. |
| 2013/0034796 A1* | 2/2013 | Hata .................... H01M 8/126 429/496 |
| 2015/0333342 A1 | 11/2015 | Planque et al. |
| 2016/0285113 A1 | 9/2016 | Di Iorio et al. |

FOREIGN PATENT DOCUMENTS

| | | |
|---|---|---|
| FR | 2 988 916 A1 | 10/2013 |
| FR | 3 000 108 A1 | 6/2014 |
| FR | 3 014 246 A1 | 6/2015 |
| WO | WO 2014/097191 A1 | 6/2014 |

OTHER PUBLICATIONS

French Preliminary Search Report dated Jun. 4, 2018 in French Application 1762483 filed on Dec. 19, 2017, citing documents AO and AW-AY therein, 2 pages.

Celik, S., "Influential parameters and performance of a glass-ceramic sealant for solid oxide fuel cells," Ceramics International, vol. 41, 2015, pp. 2744-2751, XP029106074.

Fergus, J. W., "Sealants for solid oxide fuel cells," Journal of Power Sources, vol. 147, 2005, pp. 46-57, XP027756688.

Chou, Y.-S. et al., "Compressive Mica Seals for Solid Oxide Fuel Cells," Journal of Materials Engineering and Performance, vol. 15, No. 4, 2006, pp. 414-421, XP001540102.

* cited by examiner

INTERCONNECTOR WITH A RUGGED SURFACE FOR BETTER TIGHTNESS

TECHNICAL FIELD AND PRIOR ART

The present application relates to the field of electrochemical devices and more precisely to the implementation of improved sealing structures in such devices.

It applies in particular to electrochemical devices of the fuel cell type, in particular Solid Oxide Fuel Cell (SOFC) or of the electrolyser type such as with high temperature steam (HTS, or HTSE for high temperature steam electrolysis) also with solid oxides (SOEC for "Solid Oxide Electrolyte Cell").

Generally, such electrochemical devices comprise a stack of serialised unit modules, also called "electrochemical cells".

Each unit module can be, as illustrated in FIG. 1, formed by an assembly 4 of an electrolyte 1 with two electrodes: an anode 2 and a cathode 3. The assembly 4 is generally sandwiched between two interconnect plates 5.1, 5.2 also called "interconnectors". A full electrolyser is thus formed by a stack including alternating cells and interconnectors. The interconnectors 5.1, 5.2 are electrically conducting. A function of the interconnectors 5.1, 5.2 is thus to supply an electrochemical cell with electric current. Aside from end interconnectors of the stack, the interconnectors typically include a first face in contact with the cathode of a cell and a main face, opposite to the first face, in contact with the anode of another cell.

The interconnectors 5.1, 5.2 can further participate in delivering and/or recovering released gases while separating anode and cathode compartments of two adjacent cells.

A proper operation of this stack type requires an electric insulation between two successive interconnectors, otherwise the cell may be short-circuited.

It is also attempted to provide sealing between different compartments in order to avoid an inopportune gas recombination likely to cause a decrease in efficiency and a possible occurrence of hot spots causing damage to the stack.

Documents FR2988916A1, FR3014246A1, and FR3000108 give different examples of insulating seals providing sealing in an SOEC or SOFC type electrochemical device, the seal typically including a bonding material such as glass for forming an insulating sealed partition and disposed in an insulating accommodating support contacted with an interconnector. The insulating support is generally formed by a mica frame.

In some cases, leaks may occur at these insulating seals, which can make the adjoining electrochemical cell defective.

Therefore, the problem to be addressed is to be able to improve sealing of electrochemical, in particular of the SOEC or SOFC type, devices.

DISCLOSURE OF THE INVENTION

According to one aspect, one embodiment of the present invention provides a structure for an electrochemical device, in particular of the solid oxide fuel cell (SOFC) type or solid oxide high temperature steam electrolyser (HTSE) type, the structure comprising at least one conducting support element of an interconnector characterised by at least one first face having at least one localised rough region, said rough region being able to be contacted with an insulating bonding material of a seal.

The conducting support element can for example be in the form of a metal sheet, or plate, or several assembled metal sheets or plates.

The interconnector can in turn be formed by a support element or several assembled conducting support elements. Thus, the interconnector can itself be formed by a plate, or a metal sheet, or even several plates, or several stacked metal sheets.

The insulating bonding material affixed to the rough region is typically based on glass or glass-ceramic.

By degrading or modifying the surface state of a given region of the interconnector thus roughened, the attachment of the seal and more precisely of the bonding material of glass or glass-ceramic contacted with this given region of the interconnector is improved.

The structure can further comprise an insulating support which supports or accommodates the insulating bonding material, in particular based on glass or glass-ceramic.

The insulating support can be provided with a central opening adapted to accommodate at least one electrochemical cell. In this case, the insulating bonding material can be in the form of at least one bead in contact with said rough region and distributed about said central opening.

Advantageously, when the insulating support includes one or more peripheral opening(s) disposed about the central opening, one or more other beads of insulating bonding material are distributed about said one or more peripheral openings respectively.

Advantageously, the rough region has an arrangement on the first face according to at least one given pattern forming one or more closed perimeters, the bead(s) in contact with said rough region being arranged according to a pattern reproducing said given pattern.

The conducting support element is provided with at least one second face opposite to the first face and which can also include at least another localised rough region.

In this case, this other localised rough region can be contacted with another seal.

This other seal can be disposed between said interconnector and another interconnector. In this case, the other seal can be in contact with a rough region formed on a face of this other interconnector.

According to a possible implementation, said conducting support element can be disposed against a main face of an electrically insulating support, whereas another interconnector is disposed against another main face of this electrically insulating support opposite to said main face. In this case, the insulating support can be advantageously provided with at least one through port filled with said insulating bonding material of the seal, the through port extending between said main face and said other main face, such that the insulating bonding material disposed in said port passes through the electrically insulating support and is disposed in contact with a rough region of this other interconnector.

According to another aspect, one embodiment of the present invention provides a method for making a structure for an electrochemical device in particular of the SOEC or SOFC type, comprising steps of:

a) locally modifying the surface state of a given region of a first face of a conducting support element of an interconnector, so as to roughen said given region, and b) forming the seal on said conducting support element, by disposing an insulating bonding material, in particular based on glass or glass-ceramic, in contact with said given region.

In an SOFC or SOEC electrochemical device according to prior art, the seal is mounted in contact with carriers or metal support elements on a smooth metal surface.

With the making method according to the invention, a rough surface and then the seal on this rough surface are formed, so as to obtain an improved sealing arrangement.

Step a) is advantageously performed by blasting balls or particles or grains, through at least one hole of a protective mask placed facing said first face of said conducting support element, the hole being disposed facing the given region. A localised treatment is thus performed while protecting other zones of the conducting support element.

In one particular embodiment, the conducting support element can be in the form of a first metal sheet (or plate), the method further comprising, after step a), assembling this first metal sheet (or plate) with one or more other metal sheets (or plates) in order to form an interconnector.

BRIEF DESCRIPTION OF THE DRAWINGS

The present invention will be better understood upon reading the description of exemplary embodiments given, by way of purely indicating and in no way limiting purposes, making reference to the appended drawings in which.

Identical, similar or equivalent parts of the different figures bear the same reference numerals so as to facilitate switching from one figure to the other.

The different parts represented in the figures are not necessarily drawn to a uniform scale, to make the figures more readable.

Further, in the description hereinafter, terms that depend on the orientation such as "lower", "upper", "central", "peripheral" apply considering that the structure is oriented as illustrated in the figures.

DETAILED DISCLOSURE OF PARTICULAR EMBODIMENTS

Figure 2:
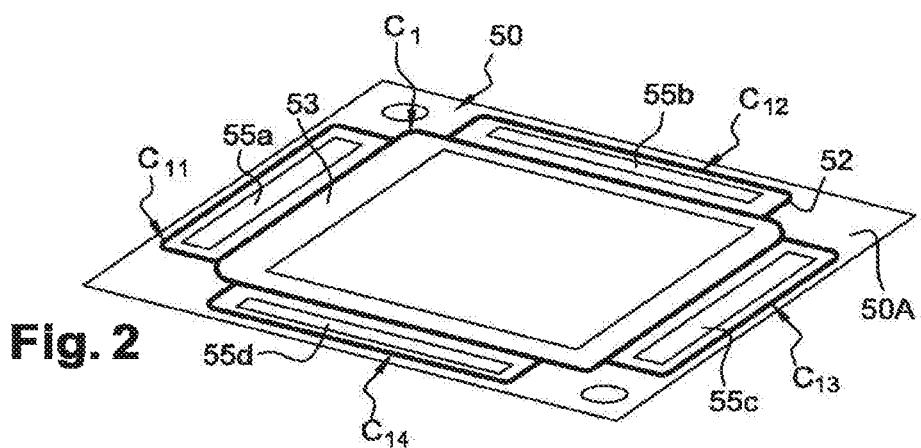
FIG. 2 is used to illustrate an interconnector for an electrochemical device and provided with at least one localised rough region for being contacted with an insulating seal material.

An exemplary interconnector support element 50 is illustrated in FIG. 2. The interconnector is to be integrated into an electrochemical device, in particular of the electrolyser type such as for example a solid oxide high temperature steam electrolyser (SOEC) or a fuel cell such as for example a solid oxide fuel cell (SOFC).

Figure 1:
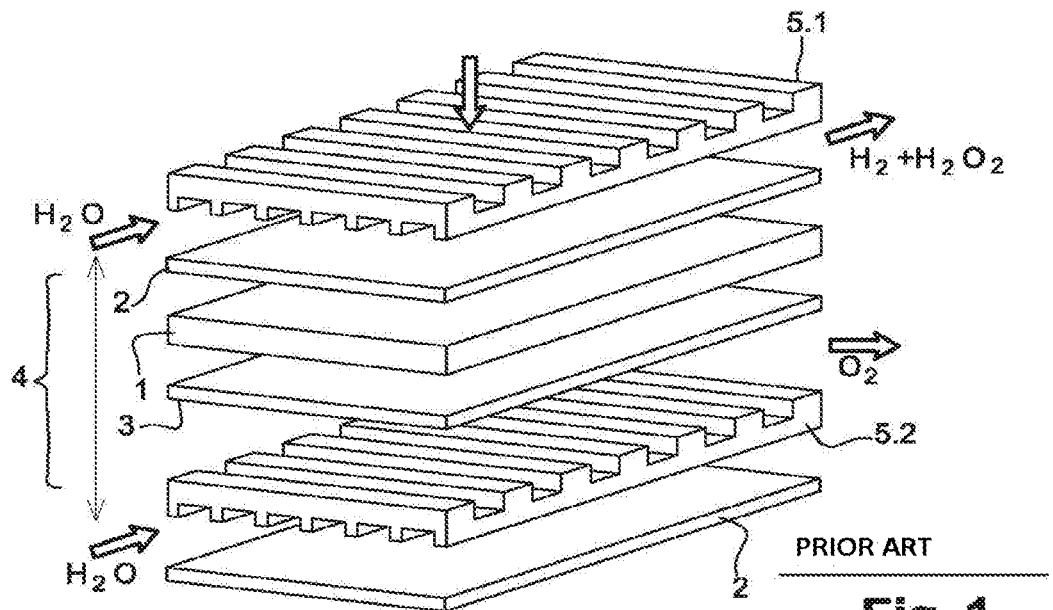
FIG. 1 is used to illustrate a conventional stack in an electrochemical device and including an electrochemical cell between two interconnectors.

The interconnector can thus provide the same functions as those of the interconnectors 5.1, 5.2 previously described in connection with FIG. 1.

The support element 50 is based on an electrically conducting material, and can be in the form of a metal sheet or an assembly of several metal sheets. The material of the support element 50 is typically a metal element and preferably able to resist corrosion and high temperatures. A ferric stainless steel, such as a K41X grade steel (designated according to EP 10088-2 standard by: X2CrTiNb18 1. 4509, or according to US standard by: 43932, Type 441), or for example nickel-based steels such as an Inconel 600 type steel, registered trademark of Special Metals Corporation, are used. The support element 50 implemented according to the invention includes a face 50A provided with a localised rough region 52. The rough region 52 has in particular an arithmetic mean roughness Ra parameter corresponding to the arithmetic mean of its profile which is higher than the rest of the face 51 or to at least other zones 53 of the face 51 which are located about the rough region 52.

The roughness of the region is a signature of a machining type. The roughness can take the appearance of streaks or grooves.

For example, the rough region 52 has a parameter Ra ranging from 3.2 to 50 µm (micrometres) or belongs to a roughness class between N8 and N12 if the old AFNOR NF E 05-051 standard is considered. Other zones 53 of the first face 50A about the localised rough region 52 have a lower average roughness than that of the rough region 52. If a support 50 of cold-rolled steel with a thickness in the order of 0.2 mm is considered, other zones 53 have an average roughness between 0.2 and 0.5 µm (micrometres).

The rough region 52 is arranged on the support element 50 as a function of the disposition of a seal and more particularly of that of a so-called "bonding" insulating material (not represented in this figure), of this seal.

This bonding material is typically based on glass or glass-ceramic and provided to make it possible to accommodate thermal expansions of the different elements, in particular of the metal support elements connected by this seal and which belong to different interconnectors.

In the exemplary embodiment illustrated in FIG. 2, the rough region 52 on the support element 50 forms a first pattern making a closed perimeter C1 disposed in a peripheral zone of the support element 50.

The rough region 52 can also include other patterns disposed about the first pattern and also making other closed perimeters C11, C12, C13, C14. In this particular example, these other patterns have a common part with the first pattern and are respectively arranged about openings 55a, 55b, 55c, 55d provided in the support element 50.

The rough region 52 results from a localised treatment at a specific place of the support element 50 aiming at locally increasing the roughness of the material making up this element 50, in particular at a place of the first face 50A for accommodating the glass or glass-ceramic type bonding material of the seal. In comparison with usually smooth surfaces of the interconnectors implemented according to prior art, this rough region 52 enables attachment with the glass or the glass-ceramic material to be improved so as to allow a better anchoring of the insulating seal in this place.

To obtain the rough region 52, first there can be a support element 50, for example in the form of a metal sheet or an assembly of stacked metal sheets, or a plate or an assembly of stacked plates, including at least one face the surface state of which is locally modified, in particular by mechanical wear or abrasion.

This treatment type is favoured with respect for example to a more expensive laser treatment and which, in some cases may modify the inner structure of the material of the support element through heating.

Advantageously, the surface state modification is made by blasting elements such as particles or balls, in particular micro-balls on at least one face 50A of the support element 50. The particles or balls can be abrasive in order to perform friction degradation. For example, sand particles or grains or steel, glass or ceramic, or for example corundum ($Al_2O_3$ or $\alpha\text{-}Al_2O_3$) balls are used. Abrasive particles that can have a particle size between for example 0.1 and 2 mm are typically used.

The dimension ranges of the particles or balls used, composition of these particles, are determined by those skilled in the art depending on the desired surface state, in particular the required parameter Ra for the surface profile.

By way of particular example, sand grains with a diameter in the order of 0.1 mm can for example be employed in order to increase the parameter Ra by 0.6 to 3.2 on the surface to be treated of a steel sheet about 0.2 mm thick. The treatment can possibly be made with abrasive particles of different sizes.

Blasting particles for the purpose of abrading can be implemented by a shot blasting or sand blasting technique. The particles can be blasted by means of an air flow the pressure of which is adjusted depending on the desired roughness. Particles are preferably blasted at a high speed for example in the order of 100 m/s, and continuously for a duration that can be for example between 1 and 3 seconds, onto the surface to be treated. Once again, the blasting duration and speed are determined by those skilled in the art as a function of the desired surface state. Under a hammering or caulking or strain hardening action, the treated surface exceeds its yield strength and undergoes plastic deformation on a thickness which can be very low and for example between several hundreds and several tens millimetres. By way of particular example, for an interconnector with a thickness in the order of 0.2 mm, a surface abrasion at a depth which can reach for example 0.05 mm can be made.

The rough region 52 can be obtained by another so-called "shot-peening" technique, in which glass or ceramic microballs are blasted. With such a technique, the rugosity can be modified without damaging or at least without excessively degrading the surface subjected to treatment.

A roughness measurement implemented using a roughness meter can be performed once the surface treatment has been made. Depending on the result of this measurement, the step of modifying the surface state of the region 52 of the support element 50 can be reiterated or not.

To allow localised modification of the region 52 to be made without degrading other zones 53 of the face 51 of the support element 50, this blasting is preferably made using a protective mask.

Figure 3:
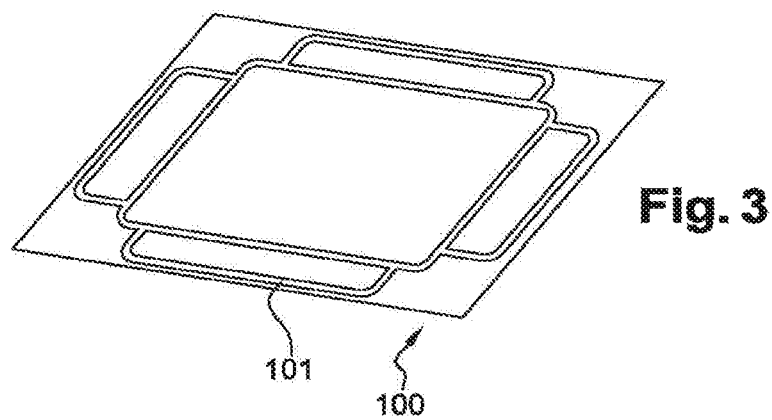
FIG. 3 is used to illustrate an exemplary protective mask likely to be used to implement a localised modification of a surface state of an interconnector with a rough region according to the invention.

One example of protective mask 100 likely to be used to form the rough region 52 is illustrated for example in FIG. 3. The mask 100 includes at least one hole in this example in the form of at least one slot 101 the pattern of which corresponds to that desired to be imparted to the rough region 52. During the treatment by blasting particles to form the rough region 52, in particular by shot blasting or shot-peening or sand blasting, the mask 100 is typically disposed in direct contact with the support element 50. As previously seen, the rough region 52 can have an arrangement corresponding to that of the insulating bonding material 77 of the seal for being affixed to the face 51 of the support element 50. Thus, in the particular exemplary embodiment illustrated in FIG. 3, the protective mask 100 includes a slot 101 reproducing the perimeters C1, C11, C12, C13, C14.

An interconnector can be formed by a support element as a single piece or result from an assembly of several conducting or metal support elements, for example as metal sheets or plates assembled. In this case, the treatment can be made to form the rough region, either on the final assembly or one or more elements (sheet(s)) for accommodating a sealing material before making this assembly.

The treatment to form the rough region(s) can even be implemented before one or more machining steps, in particular through laser, used upon manufacturing the interconnector. Thus, the treatment aiming at locally increasing roughness can be made before cutting sheets or before machining sheets once they are cut.

After the step of particle blasting, a washing step can advantageously be performed in order to avoid presence of particles in the final device. This washing can be made by blowing using for example a compressed air flow. When the surface treatment by particle blasting is made before assembling support elements or sheets, inopportune presence of particles between these sheets is thus avoided.

Figure 4A:
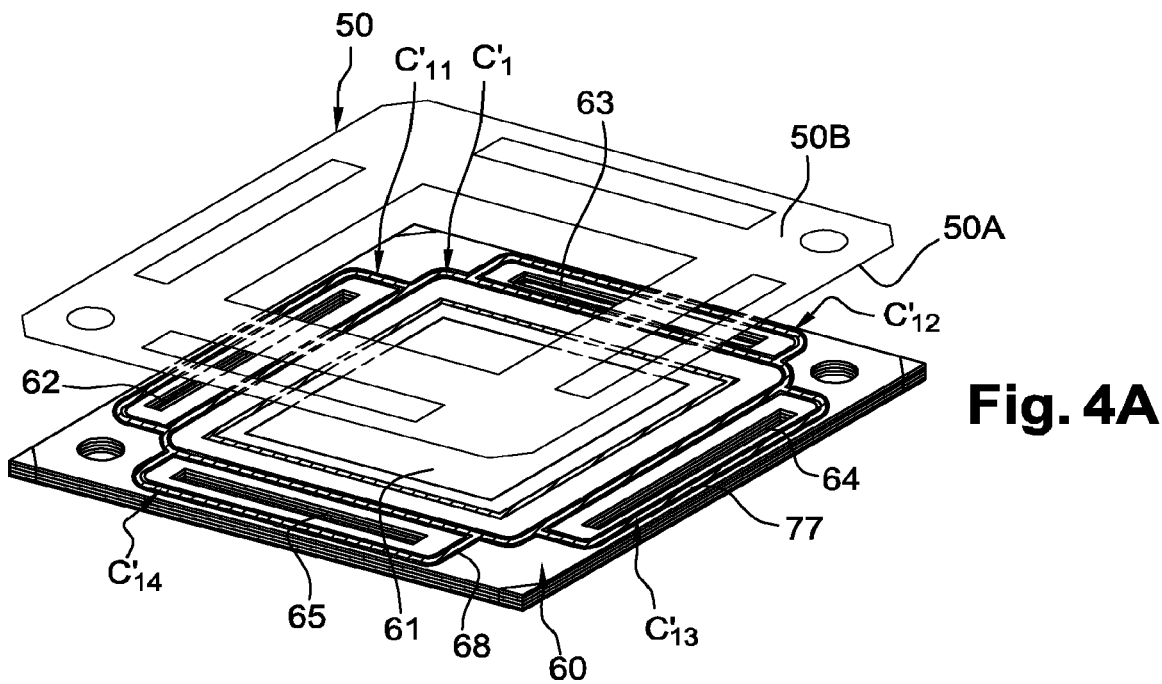
FIGS. 4A-4C are used to illustrate an exemplary arrangement of an insulating seal for being affixed to a rough region of an interconnector according to the invention.
Figure 4B:
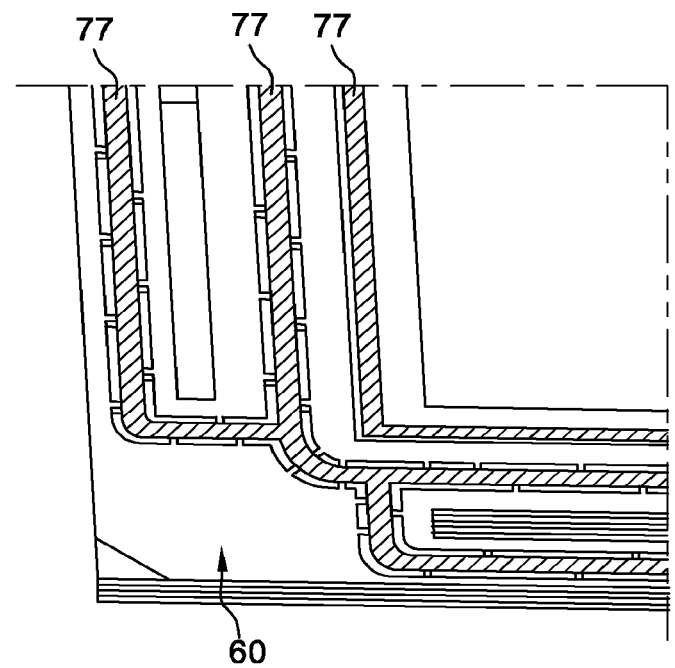

FIGS. 4A, 4B, are now referred to, showing (on overall and perspective partial views respectively) a support 60, of electrically insulating material allowing mechanical cohesion to be ensured while providing an electric insulation function. This support 60 is able to be assembled with an interconnector or interconnector support element as previously described.

Figure 4C:
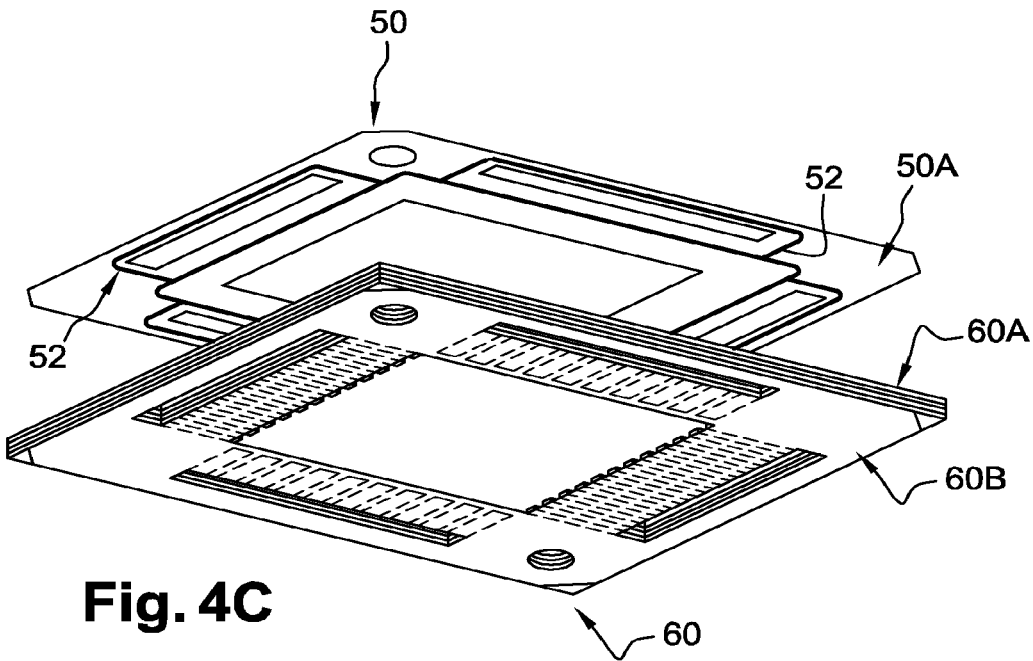

In the example illustrated, the support 60 is in the form of a frame, for example of mica. Ports 68 are provided in the insulating support 60 and enable a previously discussed insulating bonding material 77 for being contacted with the rough region 52 disposed on the first face 50A to be accommodated. This first face 50A and related rough region 52 are not visible in the top view of FIG. 4B but shown in the perspective bottom view of FIG. 4C.

The ports 68 enable the insulating bonding material 77 to be present at the opposite main faces 60A, 60B of the insulating support 60. The insulating bonding material 77, of the glass or glass-ceramic type, fills the ports 68 made in the insulating support 60 to form sealed partitions therein. The insulating bonding material 77 is in this example in the form of one or more glass or glass-ceramic material stripes or beads arranged in the ports 68 of the support 60 and making one or more continuous perimeters.

The bonding material 77 is typically deposited into the ports 68 in the form of a glass or glass-ceramic paste for example using a robot.

Different glass or glass-ceramic materials usable to form the seal are given for example in document FR 2°947°540 or in document FR 2°988°916 or document FR 3°014°246, from the Applicant.

The insulating support 60 can be provided with a central opening 61 configured to receive at least one electrochemical cell or a stack of electrochemical cells, for example of the SOEC or SOFC type. In the exemplary embodiment illustrated, the insulating support 60 is also provided with peripheral openings 62, 63, 64, 65, in particular with elongate shapes distributed about the central opening 61.

The arrangement of the insulating bonding material 77 disposed in the port(s) 68 thus follows a particular pattern in the insulating support 60 which can reproduce that of the rough region 52.

In the particular example illustrated, ports 68 filled with insulating material 77 join together and are connected to each other to form a continuous central perimeter C'1 about the central opening 61 and other closed perimeters C'11, C'12, C'13, C'14 disposed about the central perimeter C'1 and about the peripheral openings 62, 63, 64, 65 respectively. In this example, the perimeters C'1, C'11, C'12, C'13, C'14 have a similar arrangement to that of the perimeters C1, C11, C12, C13, C14 of the rough region 52 of the interconnector previously described.

The insulating support or frame 60 previously described is to be interposed between two interconnectors with preferably each of the interconnectors or support element 50 including a rough region 52 disposed against the glass or glass-ceramic based insulating bonding material 77.

Figure 5:
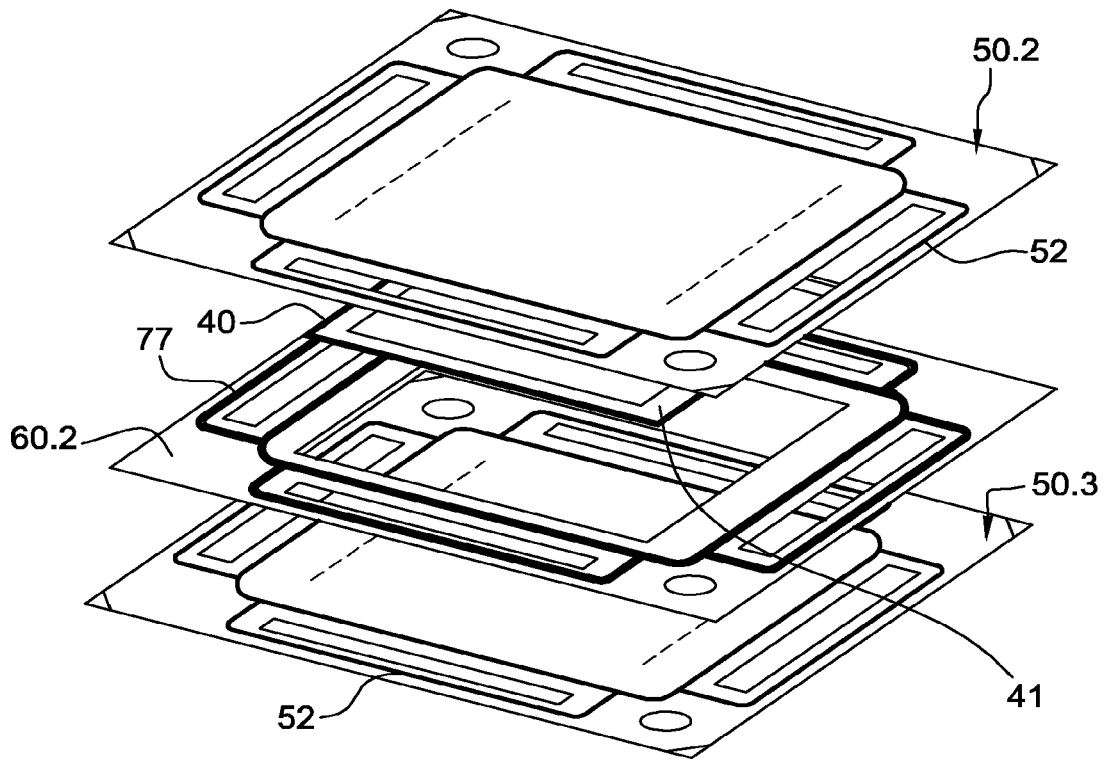
FIGS. 5 and 6 are used to illustrate an exemplary assembly in an SOEC or SOFC electrochemical device between an insulating frame, used as a support for an insulating seal as well as a zone for accommodating at least one electrochemical cell, the cell being disposed between interconnectors with a localised rough region as implemented according to the invention.
Figure 6:
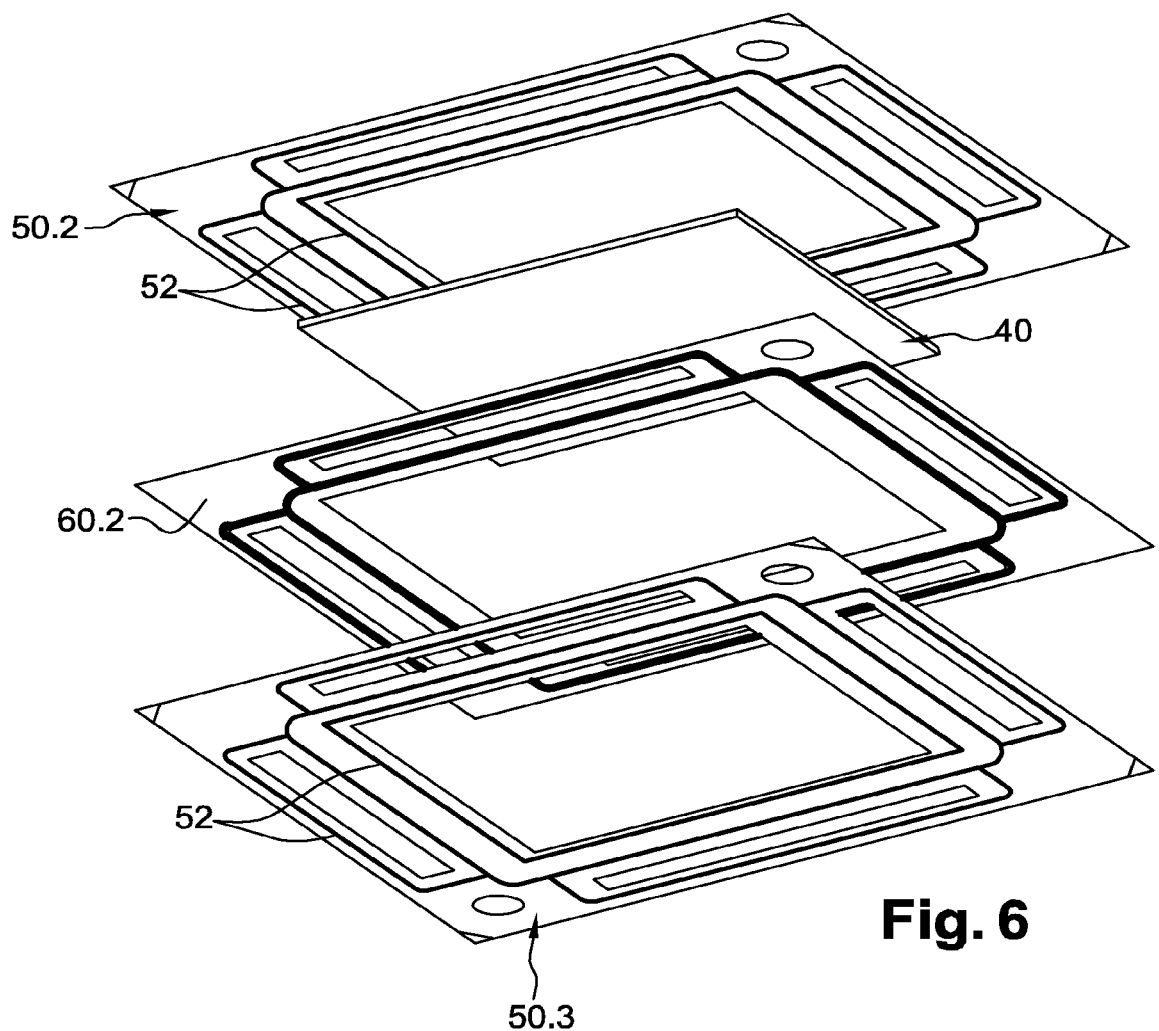

FIGS. 5 and 6 illustrate through exploded views such an assembly, with an SOEC or SOFC electrochemical cell 40 disposed inside the insulating frame 60 and arranged between interconnectors 50.2, 50.3. The cell 40 can be itself coated in the proximity of its edges with a glass or glass-ceramic type material 41 forming an insulating seal.

Figure 7:
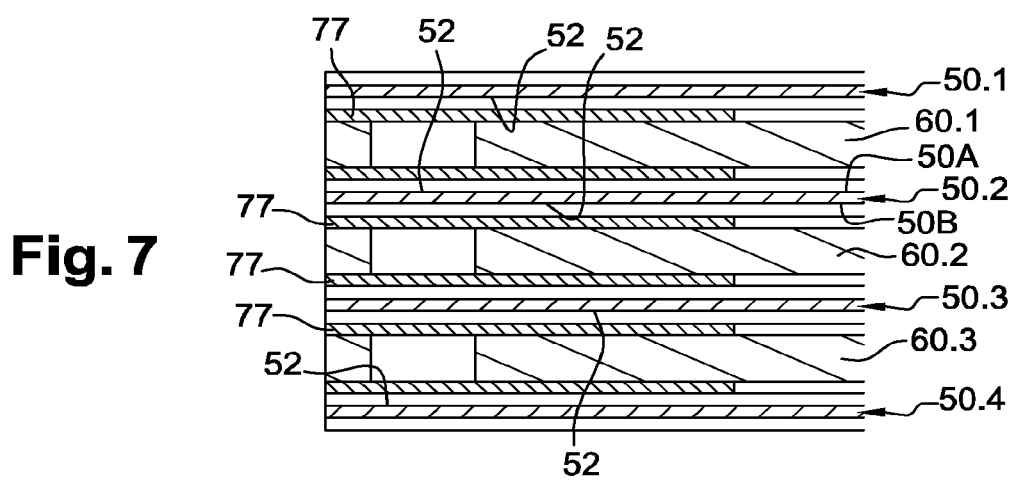
FIG. 7 is used to illustrate an exemplary stack with an interconnector provided with rough regions on each of its faces.

In the final stack of the SOEC electrolyser or SOFC cell, an interconnector 50.2 can itself be interposed between two insulating supports 60.1, 60.2 of the type of those previously described. Thus, as is illustrated in the assembly (represented schematically as a transverse cross-section) in FIG. 7, a same interconnector 50.2 can be provided with a rough region 52 on its first face 50A (in the example illustrated its upper face), and a rough region on a second face 50B (here its lower face) opposite to the first face 50A, each of these rough regions 52 being in contact with a glass or glass-ceramic type material 77 forming an insulating seal.

The invention claimed is:

1. A structure for an electrochemical device, comprising:
    an electrically conducting support element of an interconnector,
    said electrically conducting support element being further provided with a first face having a localised rough region, said localised rough region having an arithmetic mean roughness parameter corresponding to a mean roughness of its profile which is higher than a remainder of said first face, said localised rough region being in contact with an insulating bonding material of a seal.

2. The structure according to claim 1, wherein the insulating bonding material is mounted in contact to said rough region of the conducting support element, said structure further including an insulating support which supports or accommodates the insulating bonding material.

3. The structure according to claim 2, wherein the insulating support includes a central opening, adapted to accommodate an electrochemical cell, the insulating bonding material being in the form of a bead in contact with said rough region and distributed about said central opening.

4. The structure according to claim 3, wherein the insulating support includes one or more peripheral opening(s) disposed about the central opening, the insulating bonding material being in a form of one or more other beads in contact with a rough region, the other bead(s) being distributed about said one or more peripheral openings respectively.

5. The structure according to claim 3, wherein said rough region has an arrangement on the first face according to at least one given pattern forming one or more closed perimeters, the bead(s) in contact with said rough region having an arrangement that reproduces said given pattern.

6. The structure according to claim 1, wherein the conducting support element is provided with reproducing second face opposite to the first face having another localised rough region, said other localised rough region on the second face being contacted with another seal.

7. The structure according to claim 6, wherein the other seal is disposed between said interconnector and another interconnector, the other seal being in contact with a localised rough region formed on a face of the other interconnect.

8. The structure according to claim 1, wherein said conducting support element is disposed against a first main face of an electrically insulating support, and wherein another interconnector is disposed against a second main face of the electrically insulating support opposite to the first main face, the insulating support being provided with at least one port filled with said insulating bonding material of the seal, the port being a through port and extending between the first main face and a second main face, such that the insulating bonding material disposed in said port passes through the electrically insulating support and is disposed in contact with a rough region of the other interconnect.

9. A method for making a structure according to claim 1, comprising steps of:
    a) locally modifying a surface state of a given region of the first face of the conducting support element, so as to roughen said given region, and
    b) forming the seal on the conducting support element, the insulating bonding material being based on glass or glass-ceramic and being disposed in contact with said given region.

10. The method according to claim 9, wherein locally modifying comprises blasting balls or particles or grains, through at least one hole of a protective mask placed facing said first face of said conducting support element, the hole being disposed facing the given region.

11. The method according to claim 9, wherein the conducting support element is in the form of a first metal sheet, the method further comprising, after step a), assembling this first metal sheet with one or more other metal sheets in order to make an interconnector.

12. The structure according to claim 2, wherein the insulating bonding material is one of a glass based material and a glass-ceramic based material.

13. The structure according to claim 1, said electrically conducting support element being made of metal.

14. The structure according to claim 13, said metal being a steel or ferric stainless steel or a nickel based steel.

15. The structure according to claim 1, wherein the electrically conducting support element comprises one of a metal sheet, a metal plate, plural stacked metal sheets, and plural stacked metal plates.

16. The structure according to claim 1, wherein the device comprises one of a solid oxide fuel cell (SOFC) type and a solid oxide high temperature steam electrolyser (HTSE) type.

17. An electrochemical device comprising:
    a seal made of an insulating bonding material, and
    an interconnect formed of an electrically conducting support element, said electrically conducting support element being made of metal and further provided with at least one first face having at least one localised rough region, said localised rough region having an arithmetic mean roughness parameter corresponding to a mean roughness of its profile which is higher than a remainder of said first face, said localised rough region being in contact with said insulating bonding material of said seal.

\* \* \* \* \*